US011659410B2

(12) United States Patent
Dutta et al.

(10) Patent No.: US 11,659,410 B2
(45) Date of Patent: May 23, 2023

(54) DIRECTIONAL QUALITY OF SERVICE FOR BEAMFORMED SIDELINK COMMUNICATION

(71) Applicant: QUALCOMM Incorporated, San Diego, CA (US)

(72) Inventors: Sourjya Dutta, San Diego, CA (US); Kapil Gulati, Belle Mead, NJ (US); Hong Cheng, Basking Ridge, NJ (US); Qing Li, Princeton Junction, NJ (US); Junyi Li, Franklin Park, NJ (US); Gabi Sarkis, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 17/306,534

(22) Filed: May 3, 2021

(65) Prior Publication Data

US 2022/0353695 A1   Nov. 3, 2022

(51) Int. Cl.
*H04W 16/28* (2009.01)
*H04W 4/38* (2018.01)
*H04W 4/40* (2018.01)
*H04W 28/02* (2009.01)
*H04W 28/24* (2009.01)

(52) U.S. Cl.
CPC ............ *H04W 16/28* (2013.01); *H04W 4/38* (2018.02); *H04W 4/40* (2018.02); *H04W 28/0268* (2013.01); *H04W 28/24* (2013.01)

(58) Field of Classification Search
CPC ......... H04W 16/28; H04W 4/38; H04W 4/40; H04W 28/0268; H04W 28/24
See application file for complete search history.

(56) References Cited

U.S. PATENT DOCUMENTS

| 10,952,230 | B1* | 3/2021 | Pan | H04W 28/0268 |
|---|---|---|---|---|
| 2018/0234524 | A1* | 8/2018 | Cheng | H04W 76/15 |
| 2018/0279336 | A1* | 9/2018 | Yang | H04W 76/10 |
| 2019/0150003 | A1* | 5/2019 | He | H04B 7/0617 342/368 |
| 2019/0208449 | A1* | 7/2019 | Wang | H04W 36/32 |
| 2019/0230693 | A1* | 7/2019 | Li | H04W 72/563 |
| 2020/0389809 | A1* | 12/2020 | Jiang | H04L 5/0053 |
| 2021/0100061 | A1* | 4/2021 | Park | H04W 28/0268 |
| 2021/0105655 | A1 | 4/2021 | Cheng et al. | |
| 2021/0377783 | A1* | 12/2021 | Yu | H04L 45/38 |
| 2022/0014973 | A1* | 1/2022 | Perras | H04W 4/46 |
| 2022/0159776 | A1* | 5/2022 | Li | H04W 24/10 |
| 2022/0353695 | A1* | 11/2022 | Dutta | H04W 28/0268 |

FOREIGN PATENT DOCUMENTS

WO    WO-2021044382 A1    3/2021

OTHER PUBLICATIONS

International Search Report and Written Opinion—PCT/US2022/020969—ISA/EPO—dated Jun. 8, 2022.

* cited by examiner

*Primary Examiner* — Harry H Kim
(74) *Attorney, Agent, or Firm* — Holland & Hart LLP

(57) ABSTRACT

Methods, systems, and devices for wireless communications are described. A method for wireless communication at a user equipment (UE) may include determining a directional quality of service parameter for a data packet based at least in part on sensor information or application information associated with the data packet and transmitting the data packet via sidelink communications according to the directional quality of service parameter.

27 Claims, 14 Drawing Sheets

DIRECTIONAL QUALITY OF SERVICE FOR BEAMFORMED SIDELINK COMMUNICATION

FIELD OF TECHNOLOGY

The following relates to wireless communications, including directional quality of service for beamformed sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support directional quality of service for beamformed sidelink communications. Generally, the described techniques provide for device-to-device application layer quality of service (QoS) handling of data packets having directionality. In some applications, a data packet may be generated by an application and may have some applicability to directionality. For example, in a vehicle-to-everything (V2X) communications application, a message may indicate an upcoming obstacle in the road which may only be relevant for vehicles in certain locations. When the data packet is not intended for a specific recipient, but is rather meant for broadcast or groupcast in device-to-device (e.g., sidelink) communications, a UE may typically transmit the data packet in all directions, regardless of this directionality. Transmitting data packets that are only relevant in some directions in every direction (i.e., covering the 360-degree angular space) may be inefficient as many directions may not have any interested users or any users at all to receive the data packet.

Techniques described herein provide a UE with the ability to use directionality information to determine in which directions a data packet would be relevant in sidelink communications. The UE may use this information to only transmit the data packet in the relevant directions instead of in 360 degrees, which may improve QoS and reduce interference. The techniques introduce a direction of transmission into the control parameters used for transmitting data packets. The information may be provided to lower layers of a protocol architecture (e.g., an access stratum (AS) layer) to determine beamforming and scheduling. For example, in V2X examples, the direction for sending a message may be known or controlled by the application layer. The application layer or V2X layer may configure the lower layer with a QoS rule mapping to one or more radio bearers to be used for transmission of the associated data packet. These mapped radio bearers may then be used to transmit the data packet in the relevant direction. This may improve network efficiency in terms of power and time, may reduce interference, and may improve efficiency for mmW broadcast and groupcast operations.

DETAILED DESCRIPTION

The described techniques relate to improved methods, systems, devices, and apparatuses that support directional quality of service for beamformed sidelink communications. Generally, the described techniques provide directional QoS rules for application layer data packets. A V2X layer (or other device-to-device (D2D) communication layer) may create and modify QoS flows for data packets based on directional information in addition to existing QoS parameters and link identifiers.

An application layer (such as an application used for driving a vehicle) may have access to sensor information.

The sensor information may be self-sensed or received from other devices. This sensor information and information related to the application may be used to determine whether a message to be sent over the V2X network is more relevant in some directions rather than others. When a message is relevant in some directions and not others, the message (or data packet) has directionality. This directionality may be used by an application layer to determine directional QoS rules for the message.

The QoS rules may be mapped to one or more radio bearers at an access stratum layer. The mapping may be to one or more directions, antenna panels, or precoders. The UE may transmit the data packet according to the mapping. Any subsequent data packets generated at the UE may be mapped using the QoS flows, or new QoS flows may be mapped to the radio bearers in a different way.

The QoS beamformed sidelink communications technique may improve efficiency because the UE may only transmit data packets in directions that are relevant, instead of in all directions (i.e., covering the 360-degree angular space). This may improve network efficiency in terms of power and time, may reduce interference, and may improve efficiency for mmW broadcast and groupcast operations.

Aspects of the disclosure are initially described in the context of wireless communications systems. Aspects of the disclosure are further illustrated by and described with reference to protocol stack architecture, block diagrams, process flows, and flowcharts. Aspects of the disclosure are further illustrated by and described with reference to apparatus diagrams, system diagrams, and flowcharts that relate to directional quality of service indication for beamformed sidelink communications.

Figure 1:
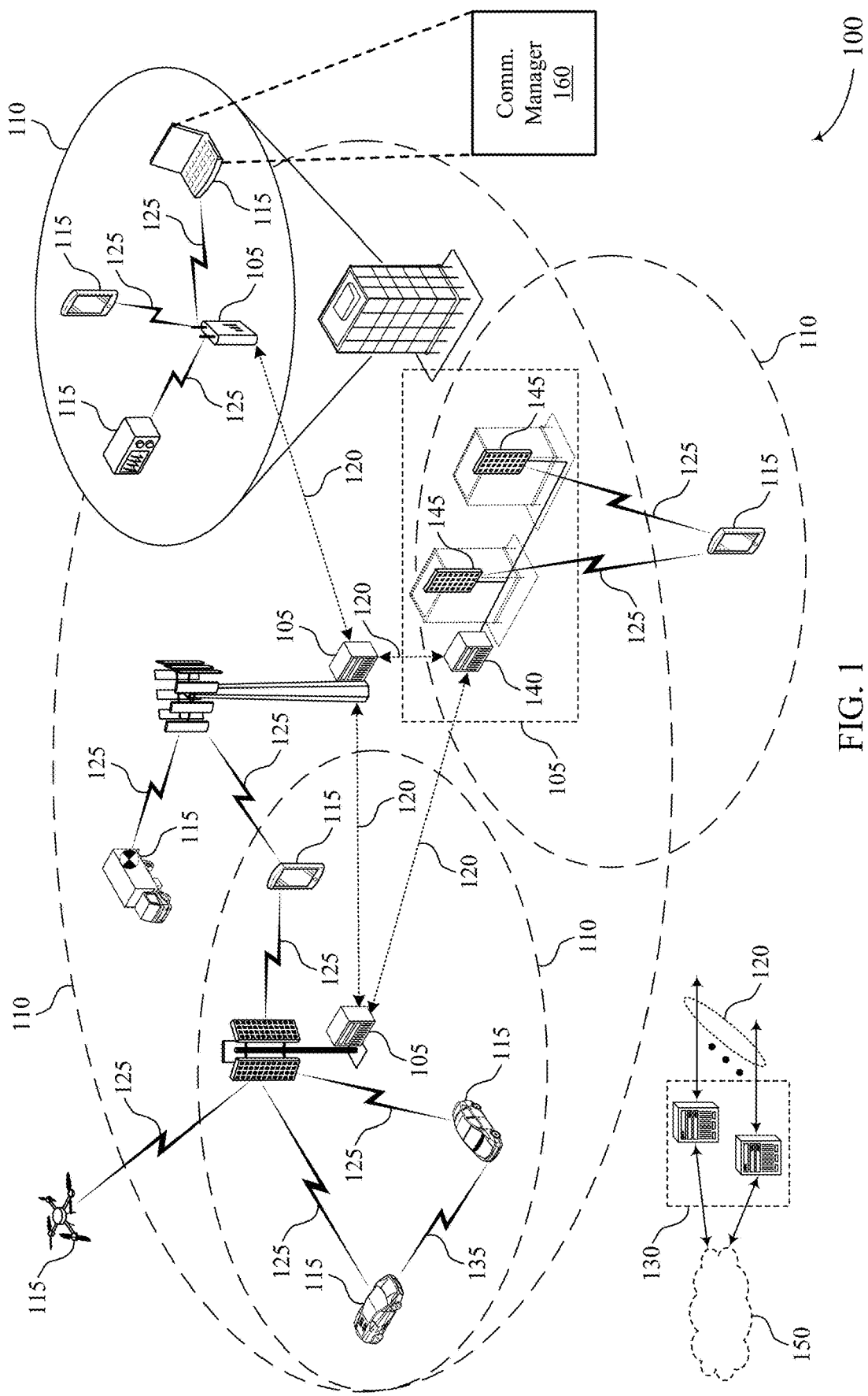
FIG. 1 illustrates an example of a wireless communications system that supports directional quality of service for beamformed sidelink communications in accordance with aspects of the present disclosure.

FIG. 1 illustrates an example of a wireless communications system 100 that supports directional quality of service for beamformed sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User Internet Protocol (IP) packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., abase station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may include a communications manager 160. The communications manager 160 may use techniques described herein to provide directional quality of service for beamformed sidelink communications. The communications manager 160 may generate a data packet associated with sensor information or application information and determine a directional QoS parameter for the data packet based at least in part on the sensor information or the application information. The communications manager 160 may also map a QoS flow to at least one radio bearer based at least in part on the directional QoS parameter and transmit the data packet according to the mapping of the QoS flow to the at least one radio bearer.

The communications manager 160 may provide a UE 115 with the ability to use directionality information to determine relevant directions that a data packet would be relevant in for sidelink communications. The UE 115 may use this information to only transmit the data packet in those directions instead of in all directions, which may improve QoS and reduce interference. The communications manager 160 may improve efficient use of network resources, reduce power consumption, and reduce processing at the UE 115. The communications manager 160 may also improve throughput, improve reliability of communications, and reduce interference with other devices.

Figure 2:
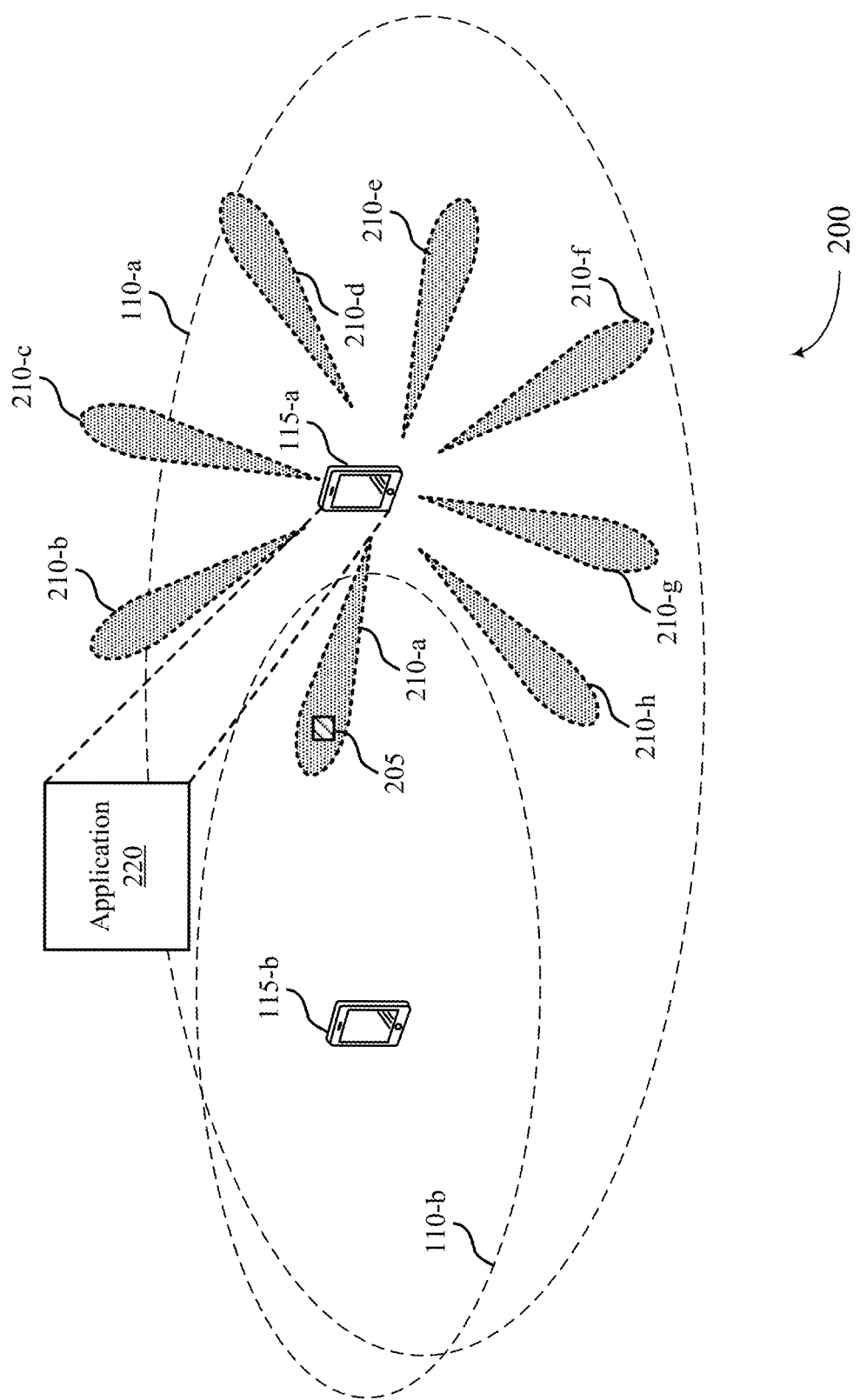
FIG. 2 illustrates an example of a wireless communications system that supports directional quality of service for beamformed sidelink communications in accordance with aspects of the present disclosure.

FIG. 2 illustrates an example of a wireless communications system 200 that supports directional QoS for beamformed sidelink communications in accordance with aspects of the present disclosure. In some examples, the wireless communications system 200 may implement aspects of wireless communications system 100. For example, the wireless communications system 200 includes UEs 115 that may be examples of one or more aspects of UEs 115 as described with reference to FIG. 1.

The UE 115-*a* may have a coverage area 110-*a* that may include a UE 115-*b*. The UE 115-*a* and the UE 115-*b* may communicate via sidelink communications. Sidelink communications are communications made via direct D2D connectivity. Here, the UE 115-*a* and the UE 115-*b* may communicate directly between each other using sidelink transmissions.

The wireless communications system 200 may be any type of communications system that can support direct D2D connectivity via sidelink transmissions. Examples of the wireless communications system 200 may include a V2V communications system, a V2X communications system, a V2N communications system, a P2P communications system, an IoT communications system, an IoE communications system, an industrial IoT (IIoT) communications system, an MTC communications system, and combinations thereof. One or more of the UEs 115 may be mounted on or otherwise included within a vehicle, an appliance, a meter, a machine, among other examples. For purposes of illustration, the wireless communications system 200 will be discussed in terms of a V2X communications system, however, the wireless communications system 200 may be any type of communications system that supports D2D connectivity.

The UE 115-*a* may be running an application 220. In this example, the application 220 is a V2X application, which can generate data packets, such as data packet 205, relevant for a V2X communications system. Examples of such data packets may relate to traffic conditions, signal scheduling, weather, safety, emergencies, or any other information relevant in a V2X communications system.

The UE 115-*a* may be capable of transmitting data packets in a 360-degree angular space, as represented by beams 210-*a* through 210-*h* (collectively referred to herein as beams 210). However, it may not always be efficient or necessary to transmit a data packet, such as data packet 205, within the 360-degree angular space. Techniques described herein support the UE 115-*a* to determine a directionality of a data packet and to transmit the data packet only in those relevant directions while meeting QoS requirements.

V2X data packets may have information that is relevant only in certain directions. For example, the application 220 may generate the data packet 205, which may have some directionality. That is, at least some of the information in the data packet 205 is more relevant in some direction than on other directions. Examples of data packets 205 having directionality may include message exchanges for the purpose of forward collision warning, which may be more important in forward direction (e.g., the approaching direction), sensor sharing message with information regarding objects (e.g., a tire or pedestrian in the roadway) detected in the front direction, which may be more important to be sent in the back direction (e.g., the receding direction), and coordinated driving message for lane changes, which may be more relevant for the side and back directions. Other examples are contemplated as well, such as, for example, if the UE 115-*a* senses it is at the end of a queue and there is no one behind the UE 115-*a* to send a message to, the UE 115-*a* will not send the message behind itself. In the V2X example, there are certain applications where it might be more beneficial to efficiently transmit a message in key directions than to transmit it to everyone within proximity of the vehicle. This may also be relevant in the cases regarding beamformed broadcast and groupcast over sidelink.

The UE 115-*a* may beamform broadcast or groupcast over sidelink. Communications in higher frequency ranges (e.g., mm-Wave) may require beamforming to meet range and QoS requirements. Broadcast and groupcast designed for sub-6 GHz communications may require transmitting a copy of the data packet 205 in all direction covering the 360-degree angular space around the UE 115-*a*, such as with beams 210. However, transmitting the data packet 205 in all directions may be inefficient as many directions may not have any users or interested users. As shown in the example of FIG. 2, only the beam 210-*a* has a user, via UE 115-*b*.

Techniques described herein may use directionality information from the application 220 to determine in which directions to transmit the data packet 205. The application 220, at the application layer, may have directionality information based at least in part on requirements of the application 220 and sensing and location information. For example, sensors such as cameras, proximity sensors, infrared sensors, light sensors, ultrasonic sensors, sonic sensors, seismic sensors, accelerometers, gyroscopes, temperature sensors, radar, lidar, pressure sensors, smoke sensors, gas sensors, alcohol sensors, liquid flow sensors, biometrics sensors, or the like, may provide the application 220 with sensor information that may relate to directionality. One or more sensors may be located on the UE 115-*a* or may be located elsewhere. The UE 115-*a* may receive the sensor information directly (e.g., when the sensor is on the UE 115-*a*) or via wired or wireless communications (e.g., when the sensor is external to the UE 115-*a*).

For example, the UE 115-*a* may include a proximity sensor that detects an object close to the UE 115-*a*, such as an obstacle in the roadway. The UE 115-*a* may provide this sensor information to the application 220, which may use the sensor information to determine a directionality for a message that warns others on the roadway about the obstacle. Other sensor information or application information may include one or more of sensor information from another wireless device in communication with the UE, sensor information from one or more sensors of the UE, a current or upcoming movement of the UE, a current or upcoming location of the UE, map information related to the UE, sensor data sharing or fusing, a type of content in the data packet, a communication mode, a service type associated with the data packet, a user intention, or the like.

In some examples, the application 220 may have information that relates to directionality of the data packets that it generates. The application layer associated with the application 220 may be able to determine the general relevance of the directionality. For example, if the driver of the vehicle carrying UE 115-*a* intends to turn left by engaging the left turn signal, the application layer may determine application information for a message to inform other drivers that the vehicle will be turning left. As used herein, a driver may refer to a person driving a vehicle or to an autonomous vehicle itself. The application 220 may use the application information to determine directionality for the message, such as to the left and behind the UE 115-*a*.

Techniques described herein provide use application information or sensor information to inform lower layers (e.g., an access stratum layer) of how to transmit the data packet for efficient broadcast/groupcast transmissions over mm-Wave bands. The techniques described herein beamform messages that meet QoS requirements without transmitting the message omni-directionally or over a broad beam where it may include areas with few or no interested users.

Figure 3:
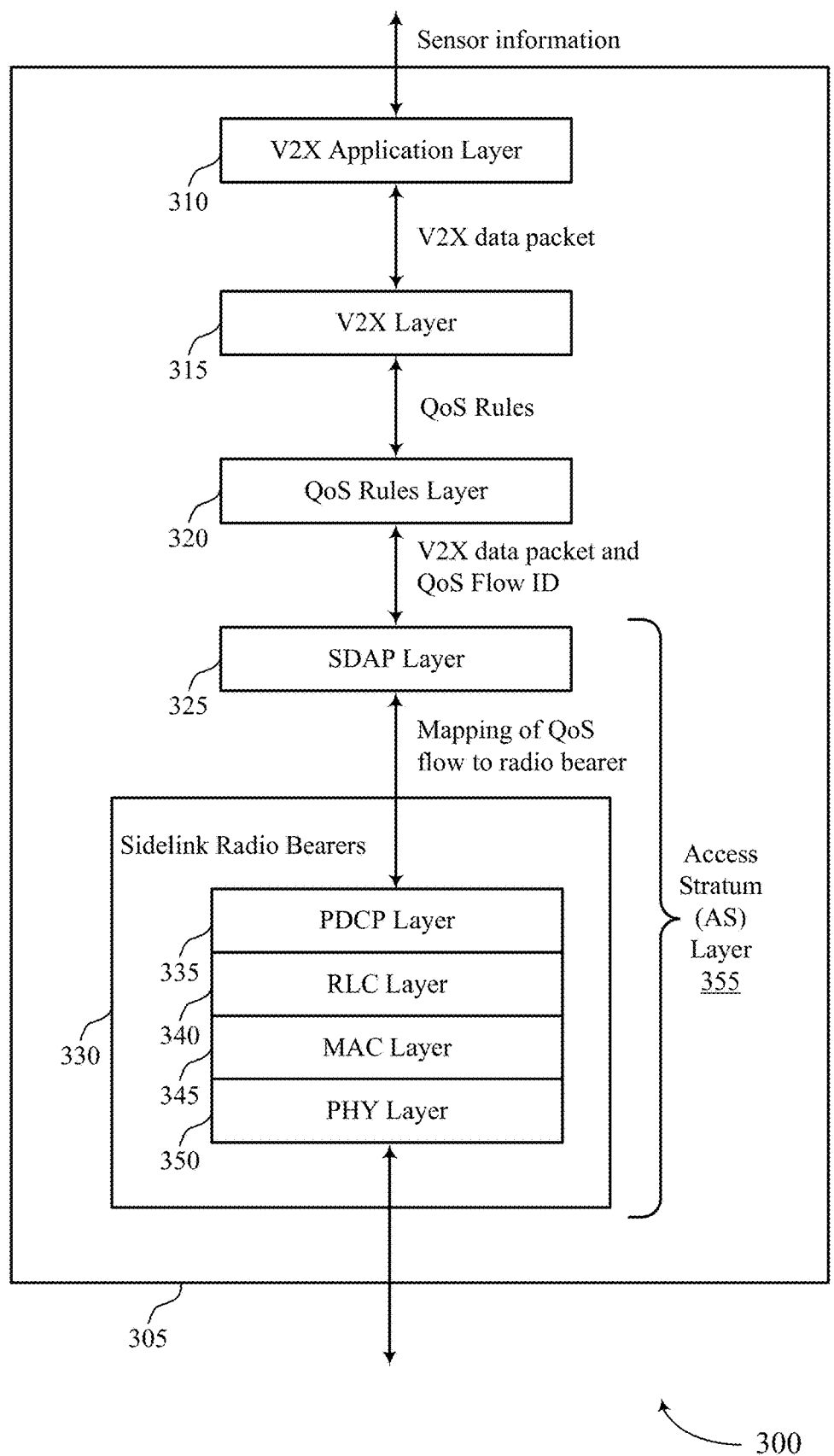
FIG. 3 illustrates an example of a process flow that supports directional quality of service for beamformed sidelink communications in accordance with aspects of the present disclosure.

FIG. 3 illustrates an example of a block diagram 300 that supports directional QoS for beamformed sidelink communications in accordance with aspects of the present disclosure. The block diagram 300 shows an example architecture 305 for a V2X application layer QoS handling. The architecture 305 may implement aspects of wireless communications system 100 and 200 as described with reference in FIGS. 1 and 2. The architecture 305 may be included in a UE 115 as described with reference in FIGS. 1 and 2. The architecture 305 may represent a protocol stack within a UE, which includes a V2X application layer 310, a V2X layer 315, QoS Rules layer 320, and an access stratum layer 355.

The architecture 305 may use a per-flow QoS model for QoS management of data packets to be transmitted by the UE. The example architecture 305 is discussed with respect to V2X, although any type of D2D system may use similar architecture. The example of architecture 305 may include NR-based Proximity Services (ProSe) communications over the proximity controller 5 (PC5) reference point. Other examples use other types of proximity-based services, such as PC2. NR-based ProSe may support three communication modes (e.g., cast types), i.e. broadcast, groupcast, and unicast, which may have their own QoS requirements.

The V2X application layer 310 may set the V2X application requirements. That is, the V2X application layer 310 can determine the application requirements through a PC5 QoS identifier (PQI) and a range model in NR. A PQI range model in the NR standards defines a PC5 QoS identifier and a range. The range is in the form of distance that may indicate a minimum distance in which the QoS parameters need to be fulfilled. The range parameter may be passed to the AS layer 355 along with the QoS parameters for dynamic control. Other parameters may be included such as delay budget, a priority, a guaranteed bit rate, a minimum bit rate, a range, a maximum data burst volume, a standardized quality of service index, or a packet error rate. These parameters may be different or the same for each direction of transmission for the data packet.

The V2X application layer 310 may provide the information and the data packet to the V2X layer 315. In some examples, the V2X layer 315 may be, for example, a P2P layer. The V2X layer 315 may create the PC5 QoS rules based on the application. The V2X layer 315 may map the V2X data packets to PC5 QoS flows and apply a PC5 QoS flow identifiers (PFIs). For each PC5 QoS flow, all of the V2X data packets that are mapped to the same flow may be marked with the same PFI.

The QoS rules layer 320 (which may be a PC5 QoS rules layer) may set a packet filter. The QoS rules layer 320 may perform any classification and marking of PC5 user plane traffic, i.e., the association of PC5 traffic to QoS flows. The QoS rules layer 320 may be part of the V2X layer 315 in some examples. The V2X layer 215 may determine what the QoS rules are going to be, which may be based on V2X application layer 310 indications.

The access stratum layer 355 may be responsible for transmission of the data packet. The access stratum layer 355 may include a service data adaptation protocol (SDAP) layer 325 and sidelink radio bearers 330, which each are associated with a PDCP layer 335, an RLC layer 340, a MAC layer 345, and a physical (PHY) layer 350. The SDAP layer 325 may receive the PC5 QoS flow information from the V2X layer 315 or the QoS rules layer 320. The SDAP layer 325 may translate the PC5 QoS flows to different radio bearer 330. Each radio bearer 330 may have its own PC5 QoS mapping.

The AS layer 355 may map the PC5 QoS flows to AS layer resources. Each PFI is mapped to a particular radio bearer. For example, some QoS flows may be mapped to the same link but with different radio bearers (e.g., non-IP flows in FIG. 4). A radio bearer determines the QoS that is required over the air. A link is defined by the two end points (e.g., UE 115-a to UE 115-b).

Figure 4:
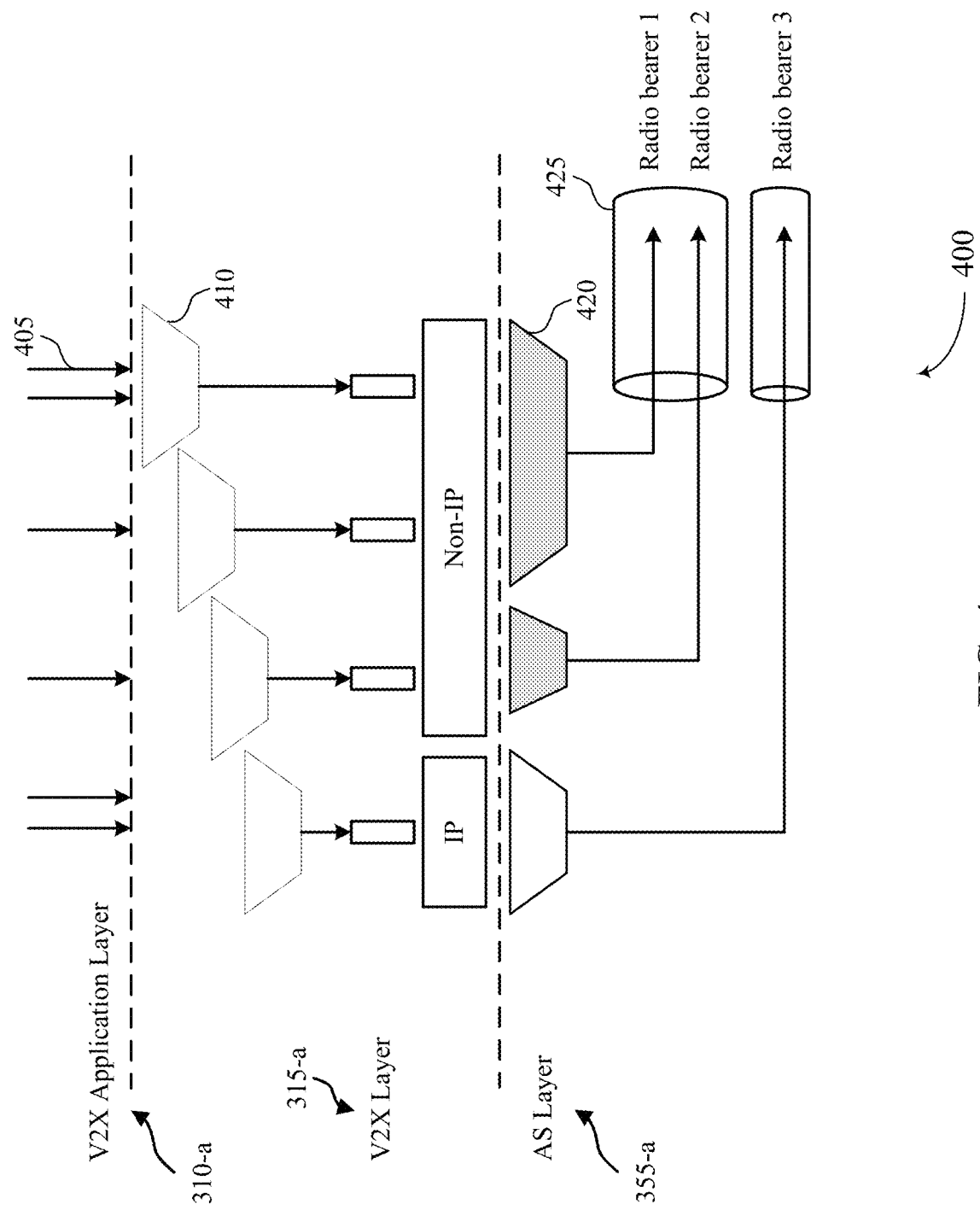
FIG. 4 illustrates an example of a block diagram that supports directional quality of service for beamformed sidelink communications in accordance with aspects of the present disclosure.

FIG. 4 illustrates an example of a diagram 400 that supports directional QoS indications for beamformed sidelink communications in accordance with aspects of the present disclosure. The diagram 400 illustrates an example of V2X application layer QoS handling. The diagram 400 may be implemented within the architecture 305 of FIG. 3. The diagram 400 may implement aspects of the wireless communications system 100 and 200 as described with reference in FIGS. 1 and 2. The diagram 400 may represent a protocol stack within a UE, which may include a V2X application layer 310-a, a V2X layer 315-a, and an access stratum layer 355-a. Although FIG. 4 is discussed herein in terms of a V2X application, this may apply to other D2D examples as well.

At 405, data packets may be generated at the V2X application layer 310-a. The data packets may be from a V2X application. The data packets may be provided to the V2X layer 315-a. The V2X layer 315-a may create the PC5 QoS rules based on the application, which may be based on sensor information or application information. At 410, the V2X layer 315-a may map the V2X data packets to PC5 QoS flows and apply the PC5 QoS flow identifier (PFI). The PC5 QoS rules filter the data packets into different QoS flows at 415. All of the V2X data packets mapped to the same QoS flow may be marked with the same PFI. The QoS flows may be IP or non-IP flows.

The application layer 310-a may provide the V2X layer with the directional QoS information. In one example, the application layer 310-a may include this in a Directional V2X Application Requirements message per service type or cast type (e.g., broadcast and/or groupcast). The V2X Application Requirements may include a set of requirements (delay, priority, error rate, etc.) per indicated direction. In another example, the application layer 310-a may include this in a Directional V2X Application Requirements message per service type per packet or per packet burst. The application layer 310-a may change these parameters for a given service based on its sensing information (e.g., extracting UEs' distribution in proximity from sensors, camera, or sensor data sharing and fusing, change these parameters based on V2X communication topology, or change these parameters based on channel congestion).

The V2X layer 315-a may provide the PC5 QoS Operation per destination ID per flow, a cast type or communication mode (e.g., unicast, groupcast, or broadcast), a radio frequency, and a transmission profile to the AS layer 355-a. The transmission profile may refer to an applicable 3GPP standard to be used for the transmission). The V2X layer 315-a may derive AS layer 355-a direction from the application layer 310-a direction requirements. For example, the application layer 310-a indicating a forward direction may translate to Panel 1 for the AS layer 355-a, etc. In another example, the V2X layer 315-a may translate the application layer 310-a direction to a set or a sub-set of AS layer 355-a precoders.

The V2X layer 315-a may maintain the PC5 QoS context based on the PFIs, a set of directional QoS rules and parameters. QoS rules applicable for each direction, and the associated service type or cast type.

At 420, the AS layer 355-a may map the PC5 QoS flow to the AS layer resources. PFI is mapped to the radio bearers. Based on the PFI, the AS layer 355-a may map a data packet to a particular radio bearer. For example, some may be mapped to the same link but with different radio bearers (e.g., non-IP flows). At 425, the data packets may be identified by source and destination identifications (if available) and a cast type.

For each source-destination ID mapping, there may be multiple radio bearers. Each radio bearer may correspond to a different QoS level. The AS layer 355-a may determine the mapping of multiple QoS flows to the same radio bearer based at least in part on information from the V2X layer 315-a.

In some examples, the application layer 310-a may indicate a change in the directional V2X application layer requirements. The V2X layer 315-a may, based on the application ID, source and destination ID, V2X service type, or cast type, determine that the indication is for a new link or service and create a new context or may determine that the indication is for a service with an existing context. The V2X layer 315-a may determine, based on the modified application layer requirements, that the QoS change is a directional QoS change. The V2X layer 315-a may indicate to the AS layer 355-a a new QoS flow by indicating the PFI, the corresponding PC5 directional QoS parameters, and source or destination IDs (if available) of link identifiers per-directional QoS flow.

Figure 5:
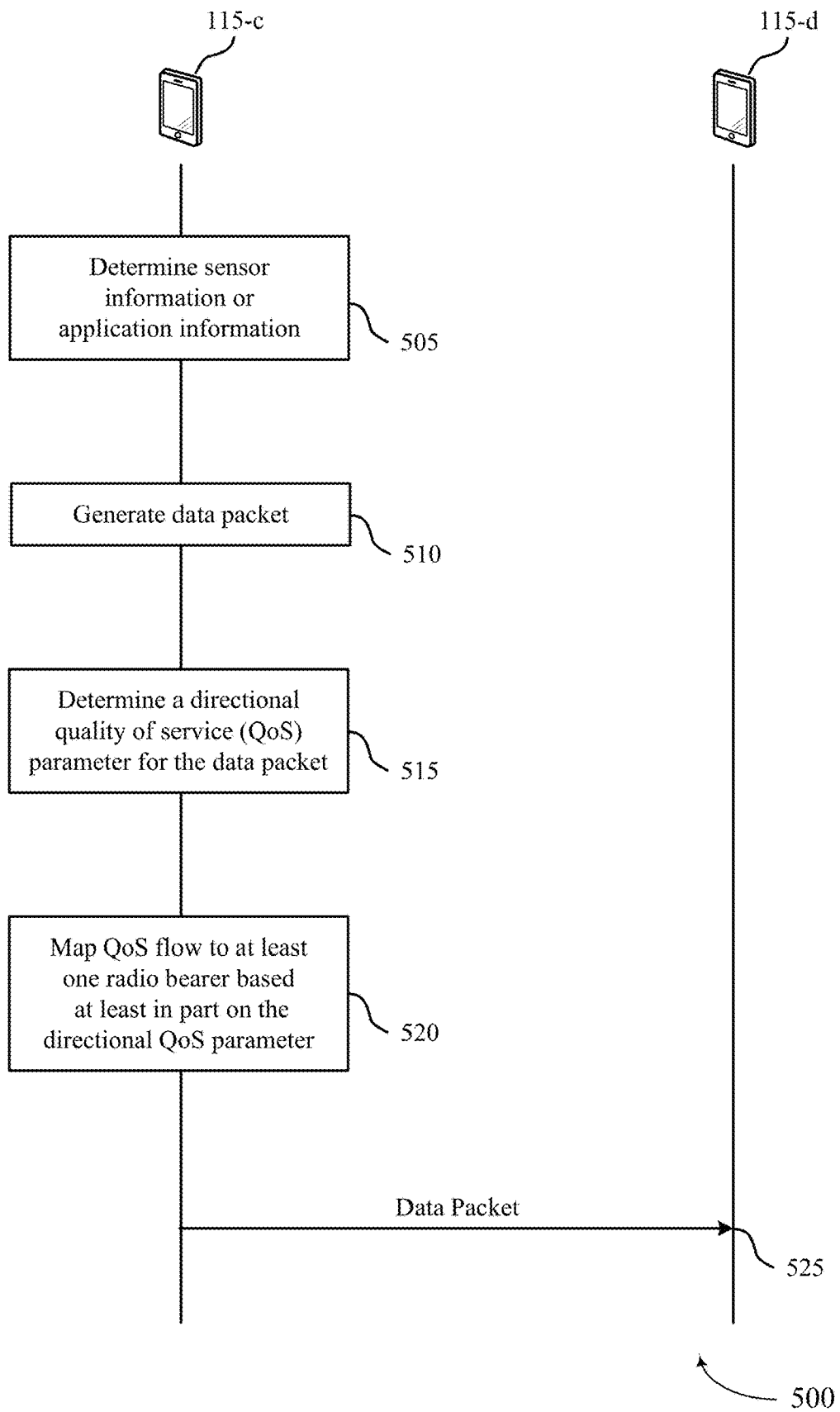
FIG. 5 illustrates an example of a diagram that supports directional quality of service for beamformed sidelink communications in accordance with aspects of the present disclosure.

FIG. 5 illustrates an example of a process flow 500 that supports directional QoS for beamformed sidelink communications in accordance with aspects of the present disclosure. In some examples, the process flow 500 may implement aspects of wireless communications system 100 and 200 of FIGS. 1 and 2, respectively. For example, the process flow 500 includes UEs 115-c and 115-d that may be examples of one or more aspects of UEs 115 as described with reference to FIGS. 1 and 2. The process flow 500 may implement aspects of the architecture 305 and the diagram 400 of FIGS. 3 and 4, respectively.

At 505, the UE 115-c may determine sensor information or application information that may be applicable for a D2D application. For example, the UE 115-c may be onboard a vehicle whose driver wants to change lanes. The driver may turn on the right turn signal. An application associated with the UE 115-c may determine that this is application information that is relevant to be sent to other users in the vicinity, such as in a V2X network. The turn signal indicator related to application information. Sensor information that may be used as well may include a proximity sensor on the right side of the vehicle as well as one behind the vehicle. Application information and sensor information may be used in conjunction.

Example sensor or application information may include one or more of sensing information from a wireless device in communication with the UE 115-c (such as information from UE 115-d), sensor information from one or more sensors of the UE 115-c, a current or upcoming movement of the UE 115-c, a current or upcoming location of the UE 115-c, map information related to the UE 115-c (e.g., where map information may be available from the cloud, etc.), sensor data sharing or fusing, a type of content in the data packet, a communication mode, a service type associated with the data packet, or a user intention. Other sensor information may include GPS, radar, lidar, or the like. The UE 115-c may receive sensor information from other UEs, such as UE 115-d. The application layer at the UE 115-c may have access to this sensor information.

At 510, the UE 115-c may generate a data packet. The data packet may include information that is relevant for other users within the V2X system (e.g., or a D2D system). In this example, the data packet may be a message that indicates the vehicle with UE 115-c may be turning right or changing into a right lane soon.

At 515, the UE 115-c may determine a directional QoS parameter for the data packet. The directional QoS parameter may indicate one or more directions in which it is relevant for the data packet to be transmitted. Determining one or more directions for transmission of the data packet may be based at least in part on the sensor information or the application information, wherein the directional QoS parameter is based at least in part on one or more directions for transmission, and wherein transmitting the data packet further comprises transmitting the data packet in the one or more directions for transmission.

In some examples, the UE 115-c may update the directional QoS parameters based at least in part on one or more of a communication network topology, a change in the sensor information or application information, or channel congestion. In some the examples, the UE 115-c may modify the directional QoS parameters based at least in part on one or more of a communication network topology, a change in the sensor information or application information, or channel congestion. In some examples, the UE 115-c may add a second directional QoS parameter based at least in part on a flow identifier, one or more directional QoS parameters, a source identification, or a destination identification.

For beamformed access, the application layer can set directional QoS rules for packets. The QoS rules may improve efficiency of groupcast and broadcast transmissions (i.e., where the UE 115-c needs to transmit a same packet to multiple UEs) in the mm-Wave bands. The QoS rules may be set semi-statically or dynamically for each relevant transmission direction.

At 520, the UE 115-c may map the QoS flow to at least one radio bearer based at least in part on the directional QoS parameter. Mapping the QoS flow may further include providing an access stratum layer of the UE 115-c with information from an application layer of the UE 115-c, wherein generating the data packet further comprises generating the data packet with an application run at the application layer. In examples where the QoS parameter is modified, the UE 115-c may update the mapping based on the modified directional QoS parameter. In some examples, the UE 115-c may map the data packet to the at least one radio bearer based at least in part on a flow identifier. In some examples, mapping the QoS flow over the at least one radio bearer is further based at least in part on a service type of the data packet, a cast type of the data packet, or a packet burst associated with the data packet. The UE 115-c may perform the mapping at 520 semi-statically or dynamically.

Mapping the QoS flow to the radio bearers may correspond to mapping the QoS flow to one or more antenna panels of the UE 115-c. In other examples, mapping the QoS flow to the radio bearers may correspond to mapping the QoS flow to one or more precoders.

At 525, the UE 115-c may transmit the data packet according to the mapping of the quality of service flow over the at least one radio bearer. In this example, the UE 115-c transmits the data packet towards the UE 115-d. The transmission may be a sidelink transmission in one or more directions according to the mapping and the directionality of the data packet. For example, at 525, the UE 115-c may transmit the data packet according to the mapping by sweeping a beam over a direction or area corresponding to the direction or QoS flow. Each transmission may be a unicast, multi-cast, or broadcast transmission so chat devices in the direction or area have an opportunity to receive the transmission.

In some examples, the UE 115-c may receive a second data packet from a first direction, wherein generating the first data packet is based at least in part on the second data packet. The UE 115-c may determine that the second data packet is to be forwarded based at least in part on a content of the second data packet, wherein determining the directional QoS parameter further comprises determining to transmit the first data packet along the first direction.

Techniques described herein provide directional QoS rules for application layer packets. The V2X layer may create or modify QoS flows based on directional information in addition to existing QoS parameters and link identifiers. For example, the V2X layer may create and modify the QoS flows based on existing QoS parameters, including packet error rate, priorities, range requirements, etc., but also takes into account the directional information that it got from the application layer and map it to a particular link identifier.

Figure 6:
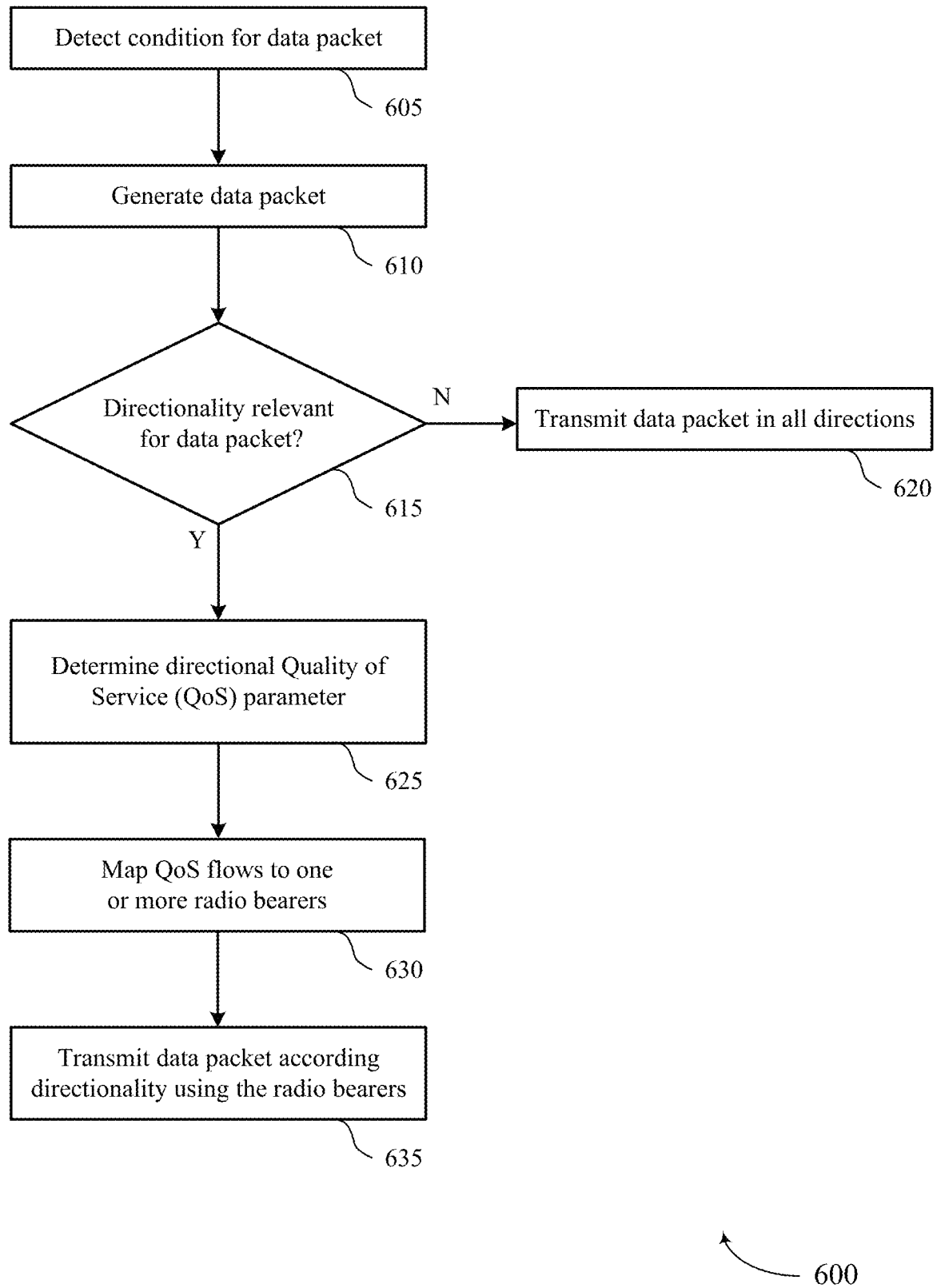
FIG. 6 illustrates shows a flowchart illustrating a method that supports directional quality of service for beamformed sidelink communications in accordance with aspects of the present disclosure.

FIG. 6 shows a flowchart illustrating a method 600 that supports directional QoS for beamformed sidelink communications in accordance with aspects of the present disclosure. The operations of the method 600 may be implemented by a UE or its components as described herein. For example, the operations of the method 600 may be performed by a UE 115 as described with reference to FIGS. 1 through 5. In some examples, a UE may execute a set of instructions to control the functional elements of the UE to perform the described functions. Additionally, or alternatively, the UE may perform aspects of the described functions using special-purpose hardware.

The method 600 may include detecting a condition for a data packet. The condition may include, for example, anything that would indicate a message should be sent to a D2D network, such as detecting an obstacle in a road in front of a vehicle in a V2X network. An application may generate a data packet corresponding to the condition at 610. The data packet may be a message that indicates something relevant to others in the D2D network.

At 615, the method 600 may include determining whether directionality is relevant for the data packet. If not, the method 600 may transmit the data packet in all directions at 620 (e.g., in a 360 angular spread). If directionality is important, for example, the data packet is relevant to be transmitted behind the UE, then the method 600 determines a directional QoS parameter for the data packet at 625.

At 630, the method 600 may map the QoS flows associated with the directional QoS parameters to one or more radio bearers. At 635, the data packet may be transmitted in the directions indicated by the mapping of the QoS flows and the radio bearers.

Figure 7:
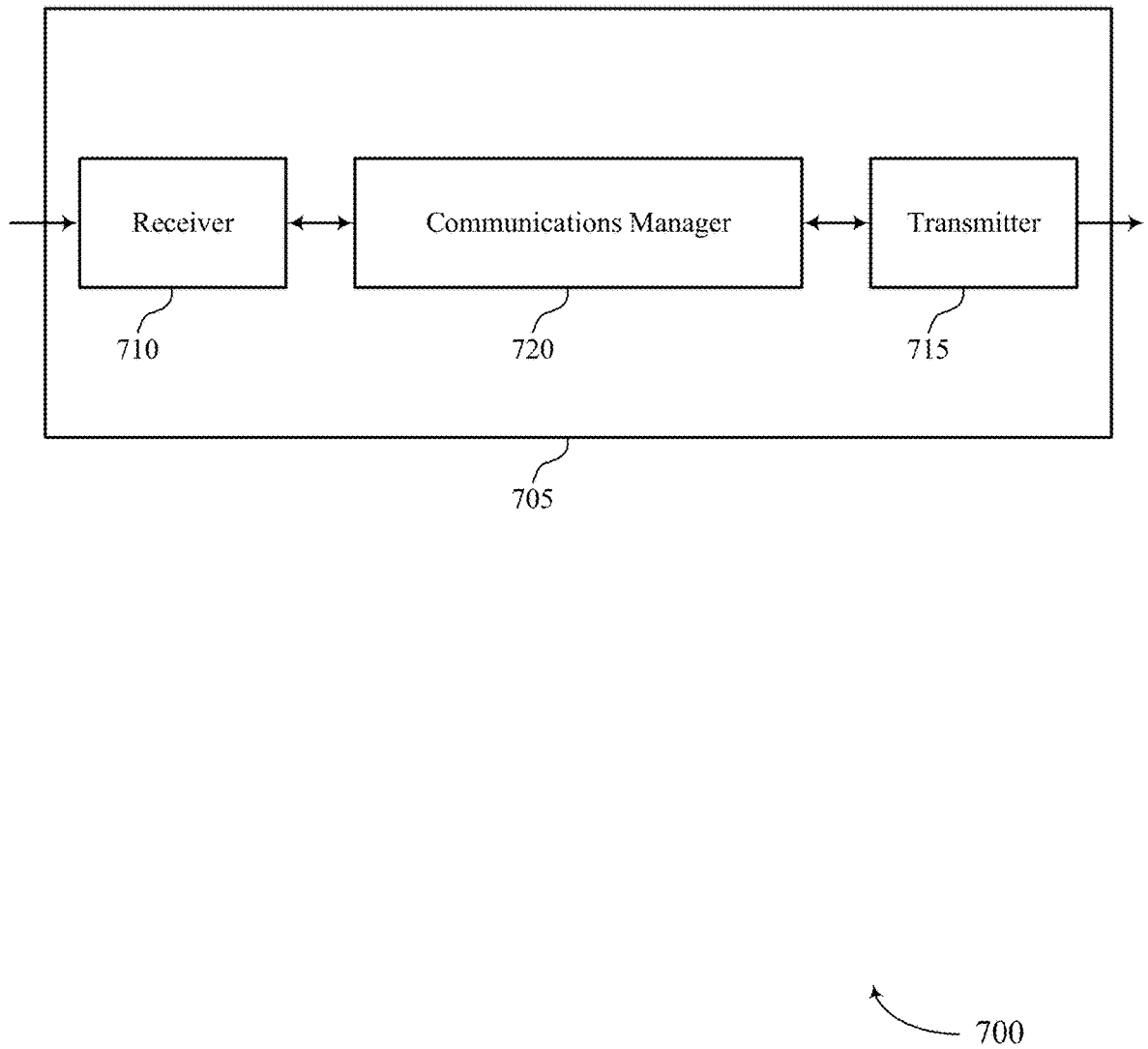
FIGS. 7 and 8 show block diagrams of devices that support directional quality of service indication for beamformed sidelink communications in accordance with aspects of the present disclosure.

FIG. 7 shows a block diagram 700 of a device 705 that supports directional QoS for beamformed sidelink communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to directional quality of service indication for beamformed sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to directional quality of service indication for beamformed sidelink communications). In some examples, the transmitter 715 may be co-located with a receiver 710 in a transceiver module. The transmitter 715 may utilize a single antenna or a set of multiple antennas. The transmitter 815 may transmit sidelink messages according to a mapping of the QoS flow to at least one radio bearer.

The communications manager 720, the receiver 710, the transmitter 715, or various combinations thereof or various components thereof may be examples of means for performing various aspects of directional QoS for beamformed sidelink communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device (PLD), a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for determining a directional QoS parameter for a data packet based on sensor information or application information associated with the data packet. The communications manager 720 may be configured as or otherwise support a means for transmitting the data packet via sidelink communications according to the directional QoS parameter.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for transmitting a data packet in relevant directions for sidelink communications. The communications manager 720 may improve network efficiencies, reduce interference, and save power by transmitting data packets only in relevant directions.

Figure 8:
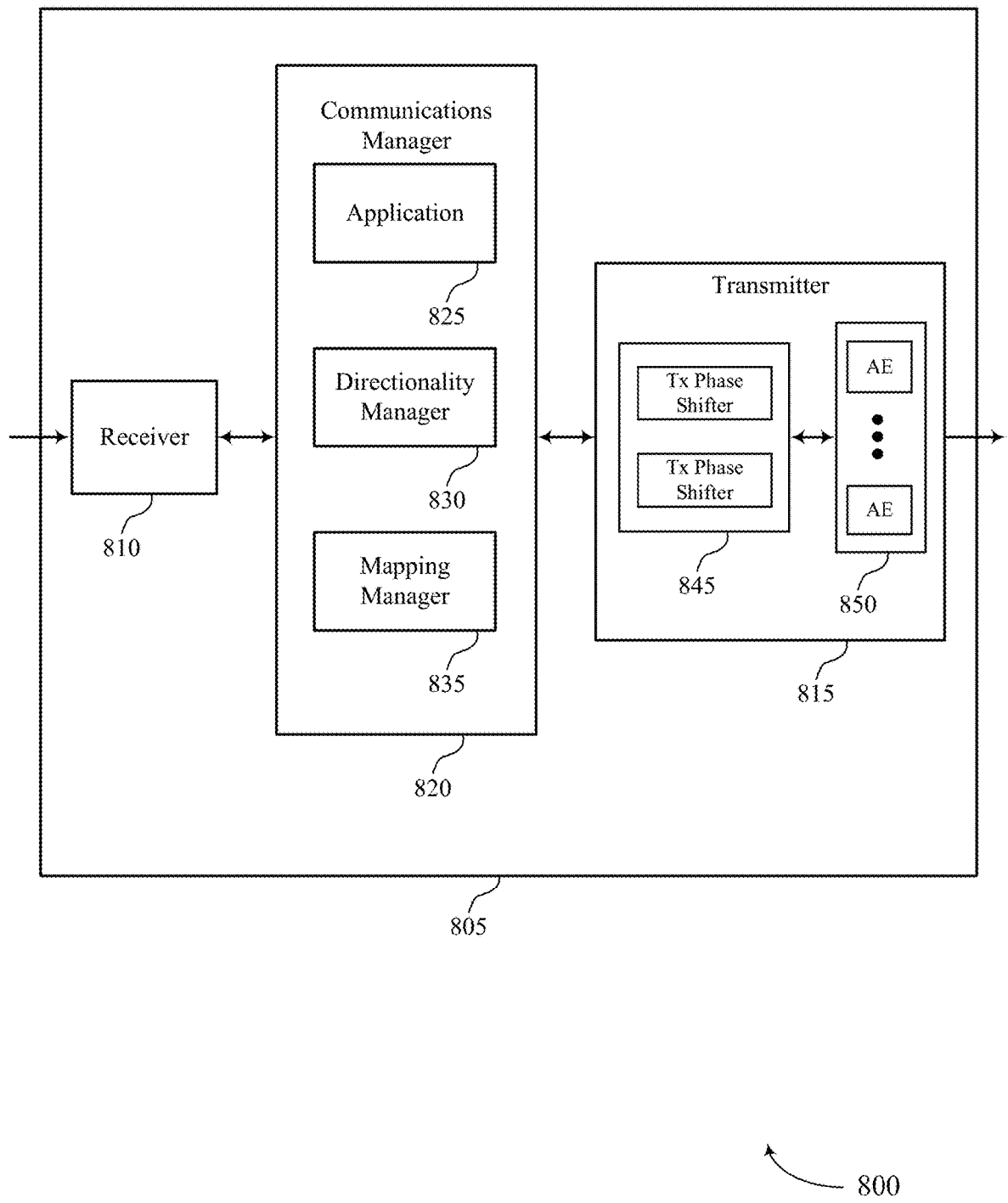

FIG. 8 shows a block diagram 800 of a device 805 that supports directional quality of service for beamformed sidelink communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to directional QoS for beamformed sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to directional QoS for beamformed sidelink communications). In some examples, the transmitter 815 may be co-located with a receiver 810 in a transceiver module. The transmitter 815 may include one or more phase shifters 845 and one or more antenna elements 850. The transmitter 815 may utilize a single antenna or a set of multiple antennas.

A phase shifter 845 may provide a configurable phase shift or phase offset to a corresponding radio frequency signal to be transmitted on a respective antenna element 850. The settings of each of the phase shifters 845 may be independent, meaning that each can be set to provide a desired amount of phase shift or the same amount of phase shift or some other configuration. A modem or other processor may have at least one control line connected to each of the phase shifters 845 and which may be used to configure the phase shifters 845 to provide a desired amounts of phase shift or phase offset between antenna elements 850.

In at least one embodiment, changing or receiving a transmit or receive beam comprises adjusting relative phase shifts for signals on different antenna elements 850. The relative phase shifts may be achieved by the modem adjusting the phase shift of the one or more phase shifters 845. The set of phases for different phase shifters 845 (and corresponding antenna elements 850) may comprise the spatial receive parameters or spatial transmit parameters for a respective beam. To receive or transmit on a beam, the spatial parameters may need to be set before the beginning of the transmitting or receiving.

The device 805, or various components thereof, may be an example of means for performing various aspects of directional QoS for beamformed sidelink communications as described herein.

For example, the communications manager 820 may include a directionality manager 825. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The directionality manager 825 may be configured as or otherwise support a means for determining a directional QoS parameter for a data packet based on sensor information or application information associated with the data packet. The directionality manager 825 may be configured as or otherwise support a means for transmitting the data packet via sidelink communications according to the directional QoS parameter.

Figure 9:
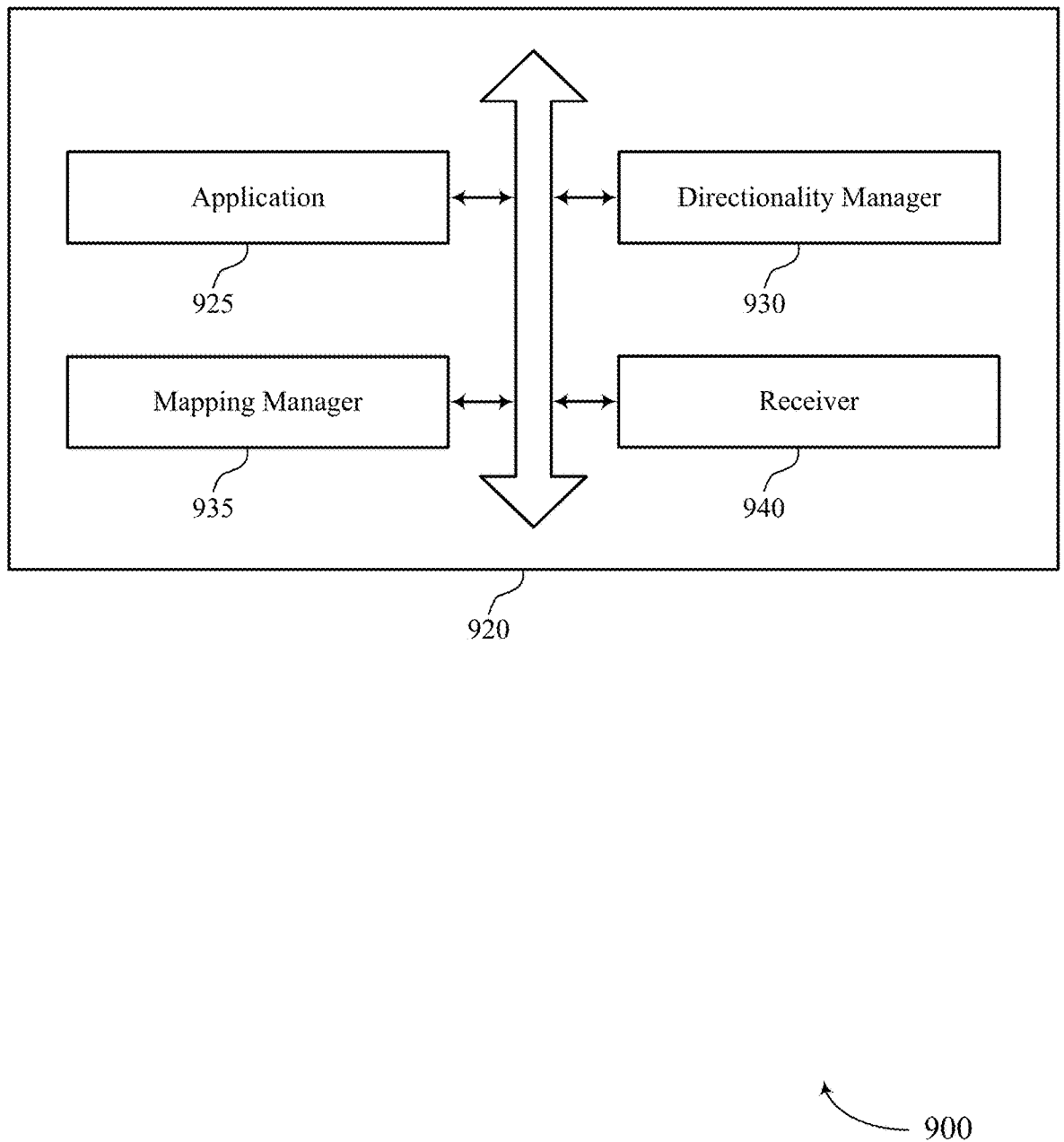
FIG. 9 shows a block diagram of a communications manager that supports directional quality of service for beamformed sidelink communications in accordance with aspects of the present disclosure.

FIG. 9 shows a block diagram 900 of a communications manager 920 that supports directional QoS for beamformed sidelink communications in accordance with aspects of the present disclosure. The communications manager 920 may be an example of aspects of a communications manager 720, a communications manager 820, or both, as described herein. The communications manager 920, or various components thereof, may be an example of means for performing various aspects of directional QoS indication for beamformed sidelink communications as described herein. For example, the communications manager 920 may include a directionality manager 925, a mapping manager 930, an application 935, a receiver 940, or any combination thereof. Each of these components may communicate, directly or indirectly, with one another (e.g., via one or more buses).

The communications manager 920 may support wireless communication at a UE in accordance with examples as disclosed herein. The directionality manager 925 may be configured as or otherwise support a means for determining a directional QoS parameter for a data packet based on sensor information or application information associated with the data packet. In some examples, the directionality manager 925 may be configured as or otherwise support a means for transmitting the data packet via sidelink communications according to the directional QoS parameter.

In some examples, the mapping manager 930 may be configured as or otherwise support a means for mapping a QoS flow to at least one radio bearer based on the directional QoS parameter, where transmitting the data packet via the sidelink communications is based on the mapping.

In some examples, to support mapping the QoS flow to the at least one radio bearer, the mapping manager 930 may be configured as or otherwise support a means for providing an access stratum layer of the UE with information from an application layer of the UE, where generating the data packet further includes generating the data packet with an application run at the application layer.

In some examples, the data packet is a first data packet, and the receiver 940 may be configured as or otherwise support a means for receiving a second data packet from a first direction, where generating the first data packet is based on the second data packet. In some examples, the data packet is a first data packet, and the directionality manager 925 may be configured as or otherwise support a means for determining that the second data packet is to be forwarded based on a content of the second data packet, where determining the directional QoS parameter further includes determining to transmit the first data packet along the first direction.

In some examples, to support mapping the QoS flow to the at least one radio bearer, the mapping manager 930 may be configured as or otherwise support a means for mapping the data packet to the at least one radio bearer based on a flow identifier.

In some examples, mapping the QoS flow over the at least one radio bearer is further based on one or more of a delay budget, a priority, a packet error rate, a guaranteed bit rate, a minimum bit rate, a range, a maximum data burst volume, or a standardized QoS index.

In some examples, mapping the QoS flow over the at least one radio bearer is based on one or more of the delay budget, the priority, a guaranteed bit rate, a minimum bit rate, a range, a maximum data burst volume, a standardized QoS index, or the packet error rate for each of one or more directions for transmission.

In some examples, mapping the QoS flow over the at least one radio bearer is further based on a service type of the data packet, a cast type of the data packet, or a packet burst associated with the data packet. In some examples, mapping the QoS flow to the at least one radio bearer is performed semi-statically or dynamically. In some examples, the mapping of the QoS flow to the at least one radio bearer corresponds to at least one or more antenna panels of the UE or to at least one or more precoders.

In some examples, the directionality manager 925 may be configured as or otherwise support a means for determining one or more directions for transmission of the data packet based on the sensor information or the application information, where the directional QoS parameter is based on one or more directions for transmission, and where transmitting the data packet further includes transmitting the data packet in the one or more directions for transmission.

In some examples, the sensor information or application information further includes one or more of sensor information from a wireless device in communication with the UE, sensor information from one or more sensors of the UE, a current or upcoming movement of the UE, a current or upcoming location of the UE, map information related to the UE, sensor data sharing or fusing, a type of content in the data packet, a communication mode, a service type associated with the data packet, or a user intention.

In some examples, the directionality manager 925 may be configured as or otherwise support a means for updating the directional QoS parameter based on one or more of a communication network topology, a change in the sensor information or application information, or channel congestion.

In some examples, the directionality manager 925 may be configured as or otherwise support a means for modifying the directional QoS parameter based on a flow identifier, one or more directional QoS parameters, a source identification, or a destination identification. In some examples, the mapping manager 930 may be configured as or otherwise support a means for updating the mapping based on the modified directional QoS parameter.

In some examples, the directionality manager 925 may be configured as or otherwise support a means for adding a second directional QoS parameter based on a flow identifier, one or more directional QoS parameters, a source identification, or a destination identification.

In some examples, the application 935 may be configured as or otherwise support a means for generating the data packet associated with the sensor information or the application information.

Figure 10:
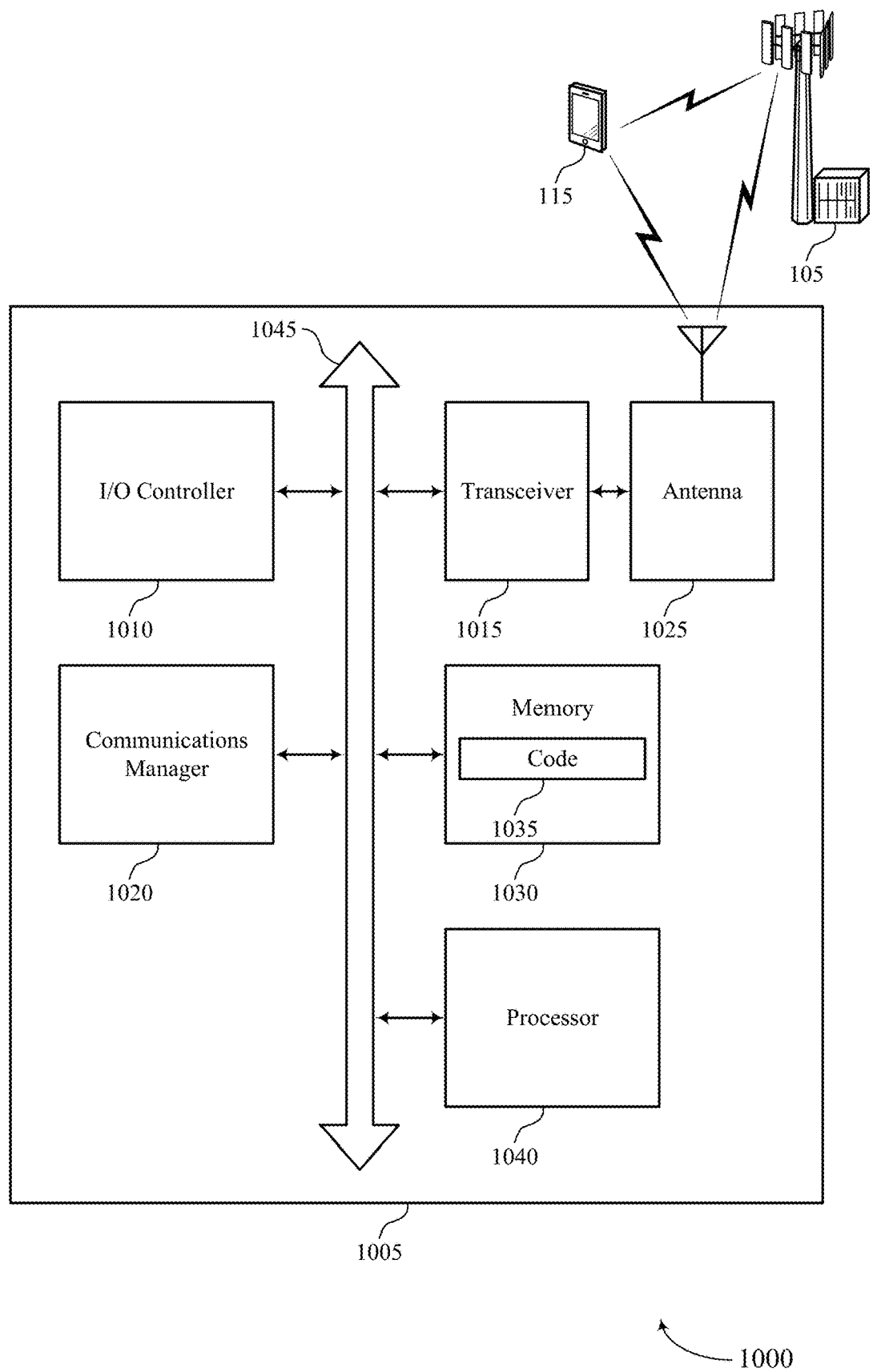
FIG. 10 shows a diagram of a system including a device that supports directional quality of service for beamformed sidelink communications in accordance with aspects of the present disclosure.

FIG. 10 shows a diagram of a system 1000 including a device 1005 that supports directional QoS for beamformed sidelink communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting directional quality of service indication for beamformed sidelink communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for determining a directional QoS parameter for a data packet based on sensor information or application information associated with the data packet. The communications manager 1020 may be configured as or otherwise support a means for transmitting the data packet via sidelink communications according to the directional QoS parameter.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of directional QoS for beamformed sidelink communications as described herein, or the processor 1040 and the memory 1030 may be otherwise configured to perform or support such operations.

Figure 11:
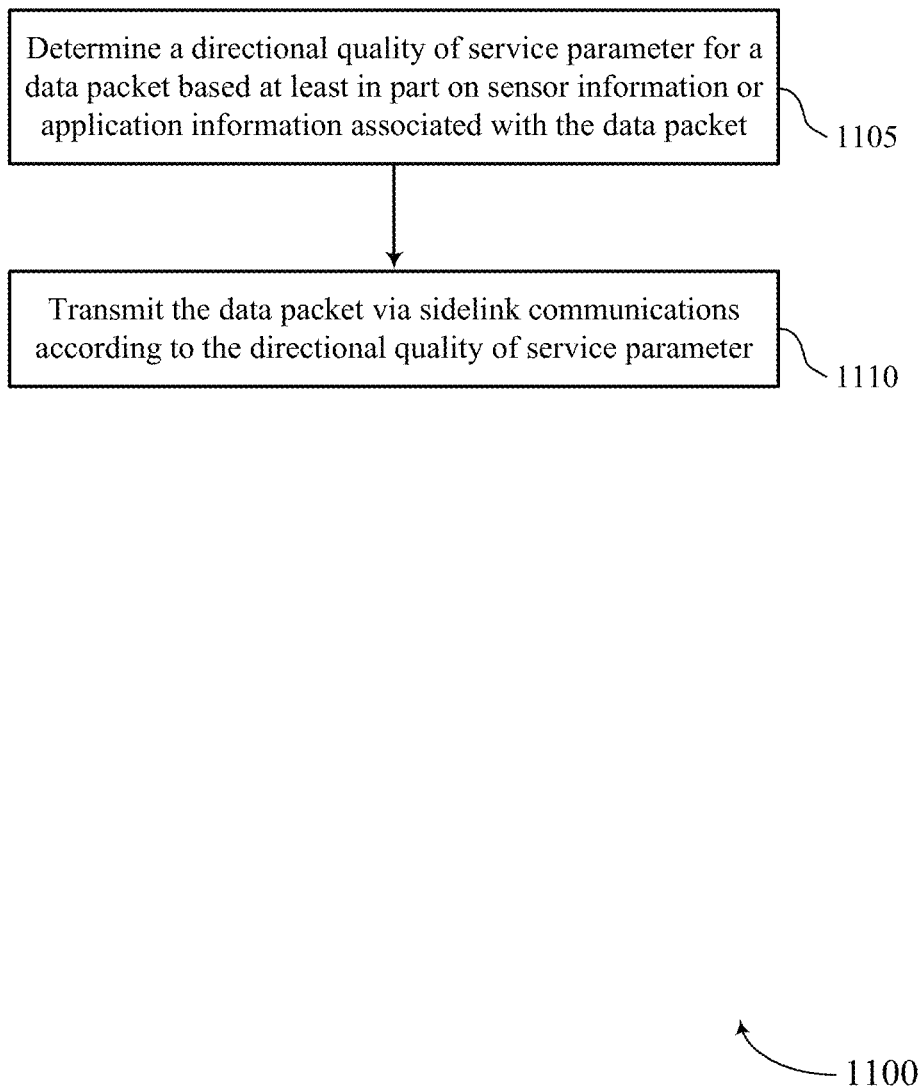
FIGS. 11 through 14 show flowcharts illustrating methods that support directional quality of service indication for beamformed sidelink communications in accordance with aspects of the present disclosure.

FIG. 11 shows a flowchart illustrating a method 1100 that supports directional QoS indication for beamformed sidelink communications in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include determining a directional QoS parameter for a data packet based on sensor information or application information associated with the data packet. The operations of 1105 may be performed in accordance with examples as disclosed herein. In some examples, aspects of the operations of 1105 may be performed by a directionality manager 925 as described with reference to FIG. 9.

At 1110, the method may include transmitting the data packet via sidelink communications according to the directional QoS parameter. The operations of 1110 may be performed in accordance with examples as disclosed herein. In some examples, aspects of the operations of 1110 may be performed by a directionality manager 925 as described with reference to FIG. 9.

Figure 12:
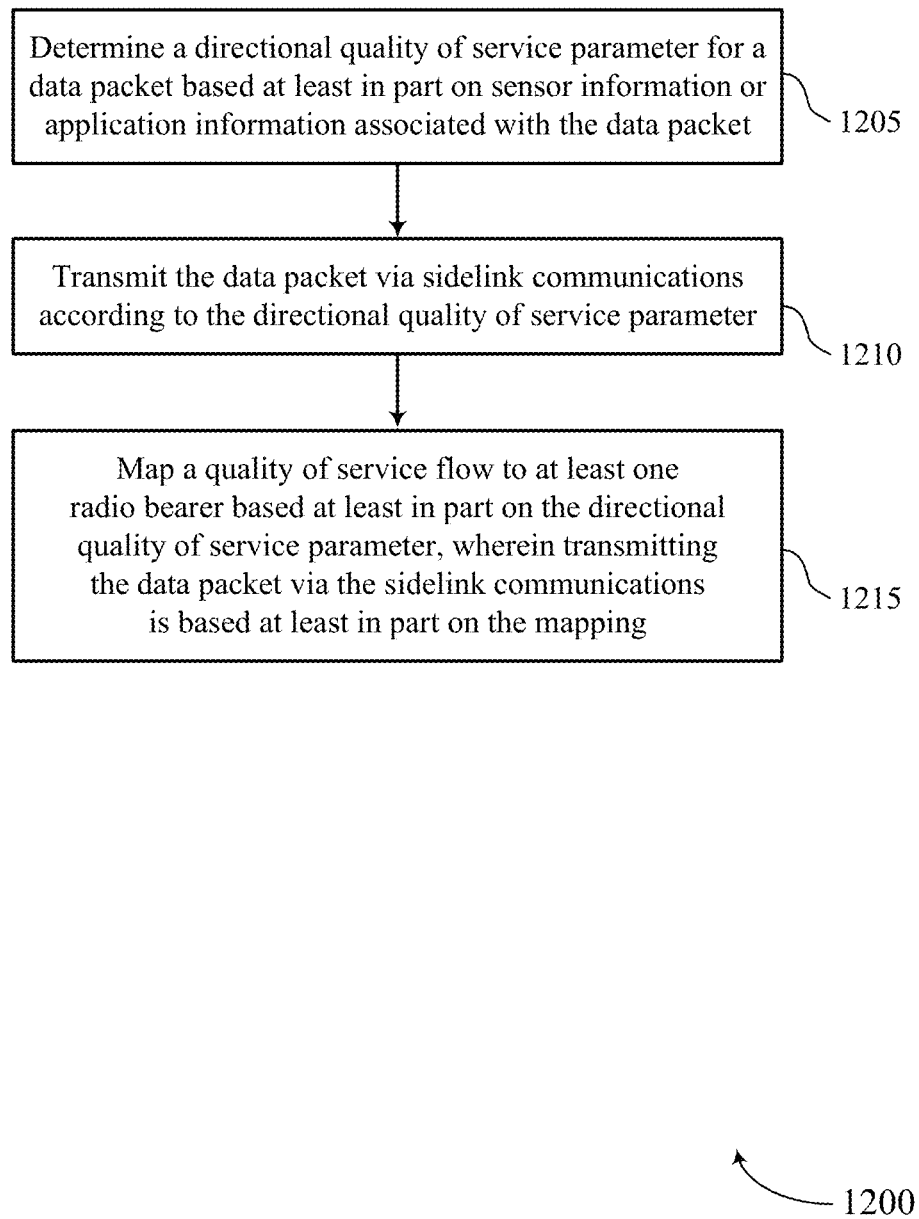

FIG. 12 shows a flowchart illustrating a method 1200 that supports directional QoS indication for beamformed sidelink communications in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include determining a directional QoS parameter for a data packet based on sensor information or application information associated with the data packet. The operations of 1205 may be performed in accordance with examples as disclosed herein. In some examples, aspects of the operations of 1205 may be performed by a directionality manager 925 as described with reference to FIG. 9.

At 1210, the method may include transmitting the data packet via sidelink communications according to the directional QoS parameter. The operations of 1210 may be performed in accordance with examples as disclosed herein. In some examples, aspects of the operations of 1210 may be performed by a directionality manager 925 as described with reference to FIG. 9.

At 1215, the method may include mapping a QoS flow to at least one radio bearer based on the directional QoS parameter, where transmitting the data packet via the sidelink communications is based on the mapping. The operations of 1215 may be performed in accordance with examples as disclosed herein. In some examples, aspects of the operations of 1215 may be performed by a mapping manager 930 as described with reference to FIG. 9.

Figure 13:
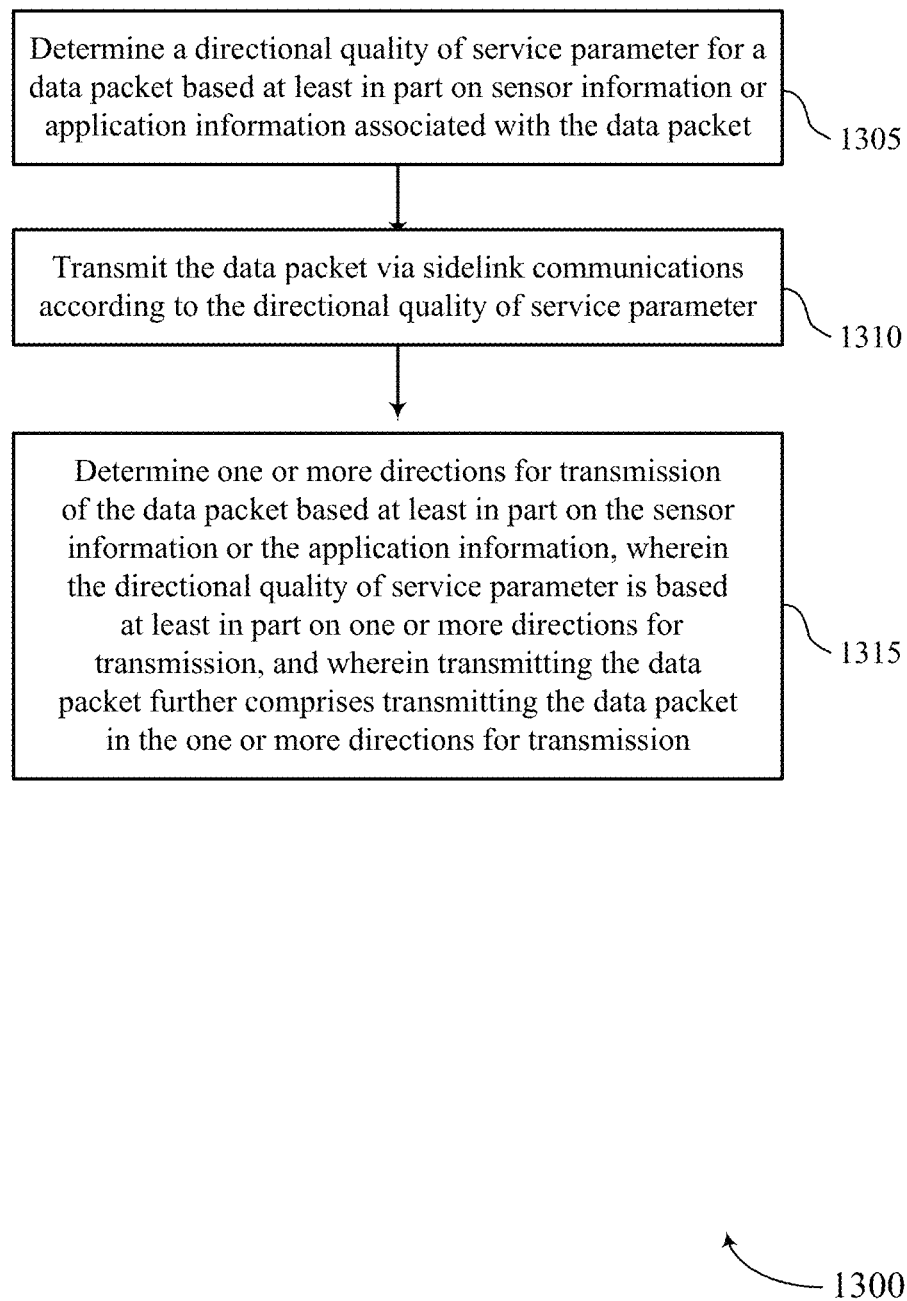

FIG. 13 shows a flowchart illustrating a method 1300 that supports directional QoS indication for beamformed sidelink communications in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include determining a directional QoS parameter for a data packet based on sensor information or application information associated with the data packet. The operations of 1305 may be performed in accordance with examples as disclosed herein. In some examples, aspects of the operations of 1305 may be performed by a directionality manager 925 as described with reference to FIG. 9.

At 1310, the method may include transmitting the data packet via sidelink communications according to the directional QoS parameter. The operations of 1310 may be performed in accordance with examples as disclosed herein. In some examples, aspects of the operations of 1310 may be performed by a directionality manager 925 as described with reference to FIG. 9.

At 1315, the method may include determining one or more directions for transmission of the data packet based on the sensor information or the application information, where the directional QoS parameter is based on one or more directions for transmission, and where transmitting the data packet further includes transmitting the data packet in the one or more directions for transmission. The operations of 1315 may be performed in accordance with examples as disclosed herein. In some examples, aspects of the operations of 1315 may be performed by a directionality manager 925 as described with reference to FIG. 9.

Figure 14:
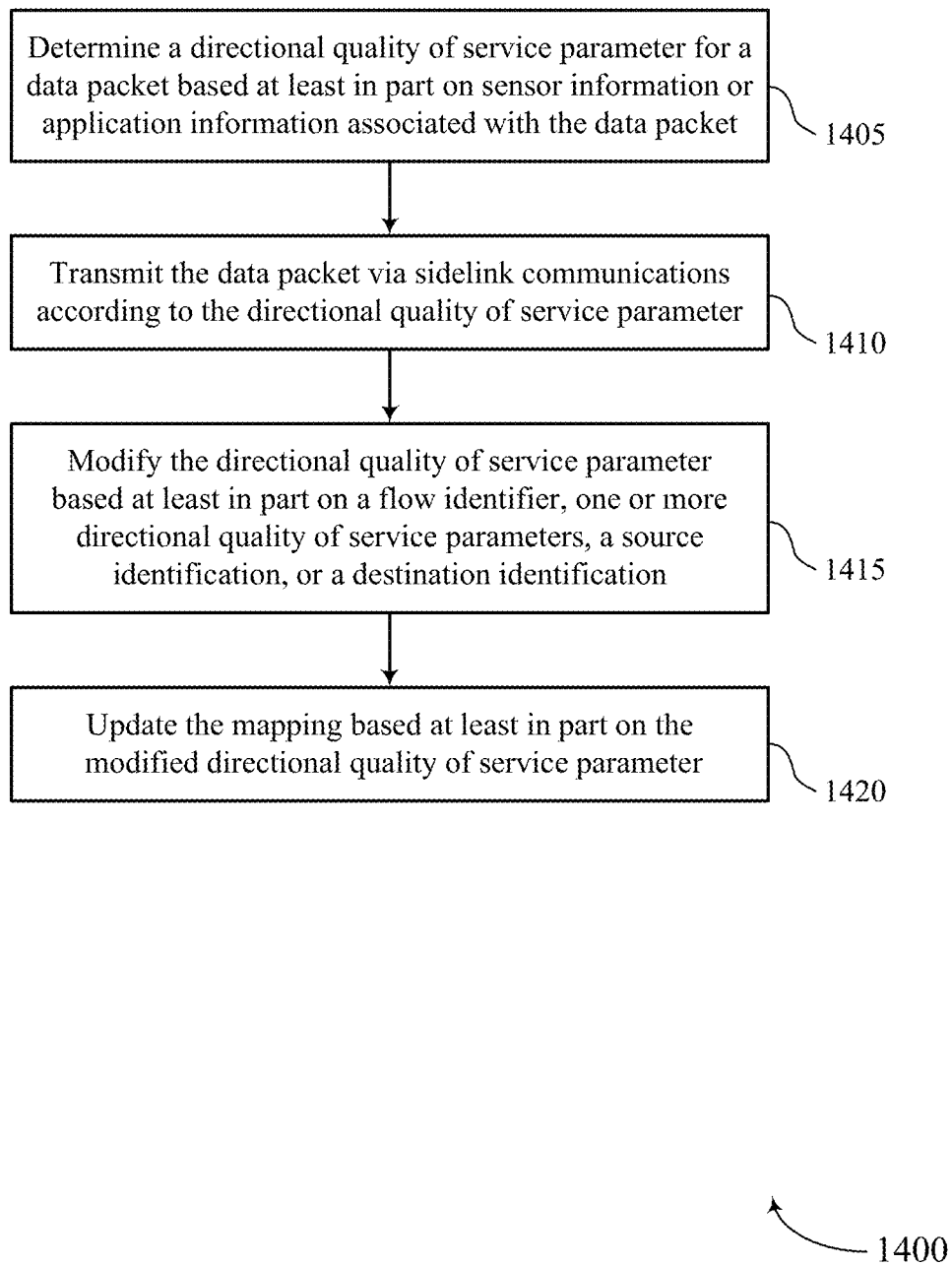

FIG. 14 shows a flowchart illustrating a method 1400 that supports directional QoS indication for beamformed sidelink communications in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include determining a directional QoS parameter for a data packet based on sensor information or application information associated with the data packet. The operations of 1405 may be performed in accordance with examples as disclosed herein. In some examples, aspects of the operations of 1405 may be performed by a directionality manager 925 as described with reference to FIG. 9.

At 1410, the method may include transmitting the data packet via sidelink communications according to the directional QoS parameter. The operations of 1410 may be performed in accordance with examples as disclosed herein. In some examples, aspects of the operations of 1410 may be performed by a directionality manager 925 as described with reference to FIG. 9.

At 1415, the method may include modifying the directional QoS parameter based on a flow identifier, one or more directional QoS parameters, a source identification, or a destination identification. The operations of 1415 may be performed in accordance with examples as disclosed herein. In some examples, aspects of the operations of 1415 may be performed by a directionality manager 925 as described with reference to FIG. 9.

At 1420, the method may include updating the mapping based on the modified directional QoS parameter. The operations of 1420 may be performed in accordance with examples as disclosed herein. In some examples, aspects of the operations of 1420 may be performed by a mapping manager 930 as described with reference to FIG. 9.

The following aspects are given by way of illustration. Aspects of the following aspects may be combined with aspects or embodiments shown or discussed in relation to the figures or elsewhere herein. The following provides an overview of aspects of the present disclosure:

Aspect 1: A method for wireless communication at a UE, comprising: determining a directional quality of service parameter for a data packet based at least in part on sensor information or application information associated with the data packet; and transmitting the data packet via sidelink communications according to the directional quality of service parameter.

Aspect 2: The method of aspect 1, further comprising: mapping a quality of service flow to at least one radio bearer based at least in part on the directional quality of service parameter, wherein transmitting the data packet via the sidelink communications is based at least in part on the mapping.

Aspect 3: The method of aspect 2, wherein mapping the quality of service flow to the at least one radio bearer further comprises: providing an access stratum layer of the UE with information from an application layer of the UE, wherein generating the data packet further comprises generating the data packet with an application run at the application layer.

Aspect 4: The method of any of aspects 2 through 3, wherein the data packet is a first data packet, the method further comprising: receiving a second data packet from a first direction, wherein generating the first data packet is based at least in part on the second data packet; and determining that the second data packet is to be forwarded based at least in part on a content of the second data packet, wherein determining the directional quality of service parameter further comprises determining to transmit the first data packet along the first direction.

Aspect 5: The method of any of aspects 2 through 4, wherein mapping the quality of service flow to the at least one radio bearer further comprises: mapping the data packet to the at least one radio bearer based at least in part on a flow identifier.

Aspect 6: The method of any of aspects 2 through 5, wherein mapping the quality of service flow over the at least one radio bearer is further based at least in part on one or more of a delay budget, a priority, a packet error rate, a guaranteed bit rate, a minimum bit rate, a range, a maximum data burst volume, or a standardized quality of service index.

Aspect 7: The method of aspect 6, wherein mapping the quality of service flow over the at least one radio bearer is based at least in part on one or more of the delay budget, the priority, a guaranteed bit rate, a minimum bit rate, a range, a maximum data burst volume, a standardized quality of service index, or the packet error rate for each of one or more directions for transmission.

Aspect 8: The method of any of aspects 2 through 7, wherein mapping the quality of service flow over the at least one radio bearer is further based at least in part on a service type of the data packet, a cast type of the data packet, or a packet burst associated with the data packet.

Aspect 9: The method of any of aspects 2 through 8, wherein mapping the quality of service flow to the at least one radio bearer is performed semi-statically or dynamically.

Aspect 10: The method of any of aspects 2 through 9, wherein the mapping of the quality of service flow to the at least one radio bearer corresponds to at least one or more antenna panels of the UE or to at least one or more precoders.

Aspect 11: The method of any of aspects 1 through 10, further comprising: determining one or more directions for transmission of the data packet based at least in part on the sensor information or the application information, wherein the directional quality of service parameter is based at least in part on one or more directions for transmission, and wherein transmitting the data packet further comprises transmitting the data packet in the one or more directions for transmission.

Aspect 12: The method of aspect 11, wherein the sensor information or application information further comprises one or more of sensor information from a wireless device in communication with the UE, sensor information from one or more sensors of the UE, a current or upcoming movement of the UE, a current or upcoming location of the UE, map information related to the UE, sensor data sharing or fusing, a type of content in the data packet, a communication mode, a service type associated with the data packet, or a user intention.

Aspect 13: The method of aspect 12, further comprising: updating the directional quality of service parameter based at least in part on one or more of a communication network topology, a change in the sensor information or application information, or channel congestion.

Aspect 14: The method of any of aspects 1 through 13, further comprising: modifying the directional quality of service parameter based at least in part on a flow identifier, one or more directional quality of service parameters, a source identification, or a destination identification; and updating the mapping based at least in part on the modified directional quality of service parameter.

Aspect 15: The method of any of aspects 1 through 14, further comprising: adding a second directional quality of service parameter based at least in part on a flow identifier, one or more directional quality of service parameters, a source identification, or a destination identification.

Aspect 16: The method of any of aspects 1 through 15, further comprising: generating the data packet associated with the sensor information or the application information.

Aspect 17: An apparatus for wireless communication at a UE, comprising a processor; memory coupled with the processor; and instructions stored in the memory and executable by the processor to cause the apparatus to perform a method of any of aspects 1 through 16.

Aspect 18: An apparatus for wireless communication at a UE, comprising at least one means for performing a method of any of aspects 1 through 16.

Aspect 19: A non-transitory computer-readable medium storing code for wireless communication at a UE, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based at least in part on" shall not be construed as a reference to a closed set of conditions. For example, an example step that is described as "based at least in part on condition A" may be based at least in part on both a condition A and a condition B without departing from the scope of the present disclosure. In other words, as used herein, the phrase "based at least in part on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    determining a directional quality of service parameter for a data packet based at least in part on sensor information or application information associated with the data packet;
    mapping a quality of service flow to at least one radio bearer based at least in part on the directional quality of service parameter, wherein the mapping of the quality of service flow to the at least one radio bearer corresponds to at least one or more antenna panels of the UE or to at least one or more precoders; and
    transmitting the data packet via sidelink communications according to the directional quality of service parameter based at least in part on the mapping.

2. The method of claim 1, wherein mapping the quality of service flow to the at least one radio bearer further comprises:
    providing an access stratum layer of the UE with information from an application layer of the UE; and
    generating the data packet with an application run at the application layer.

3. The method of claim 1, wherein the data packet is a first data packet, the method further comprising:
    receiving a second data packet from a first direction, wherein generating the first data packet is based at least in part on the second data packet; and
    determining that the second data packet is to be forwarded based at least in part on a content of the second data packet, wherein determining the directional quality of service parameter further comprises determining to transmit the first data packet along the first direction.

4. The method of claim 1, wherein mapping the quality of service flow to the at least one radio bearer further comprises:
    mapping the data packet to the at least one radio bearer based at least in part on a flow identifier.

5. The method of claim 1, wherein mapping the quality of service flow over the at least one radio bearer is further based at least in part on one or more of a delay budget, a priority, a packet error rate, a guaranteed bit rate, a minimum bit rate, a range, a maximum data burst volume, or a standardized quality of service index.

6. The method of claim 5, wherein mapping the quality of service flow over the at least one radio bearer is based at least in part on, for each of one or more directions for transmission, one or more of the delay budget, the priority, the guaranteed bit rate, the minimum bit rate, the range, the maximum data burst volume, the standardized quality of service index, or the packet error rate.

7. The method of claim 1, wherein mapping the quality of service flow over the at least one radio bearer is further based at least in part on a service type of the data packet, a cast type of the data packet, or a packet burst associated with the data packet.

8. The method of claim 1, wherein mapping the quality of service flow to the at least one radio bearer is performed semi-statically or dynamically.

9. The method of claim 1, further comprising:
    determining one or more directions for transmission of the data packet based at least in part on the sensor information or the application information, wherein the directional quality of service parameter is based at least in part on one or more directions for transmission, and wherein transmitting the data packet further comprises transmitting the data packet in the one or more directions for transmission.

10. The method of claim 9, wherein the sensor information or application information further comprises one or more of sensor information from a wireless device in communication with the UE, sensor information from one or more sensors of the UE, a current or upcoming movement of the UE, a current or upcoming location of the UE, map information related to the UE, sensor data sharing or fusing, a type of content in the data packet, a communication mode, a service type associated with the data packet, or a user intention.

11. The method of claim 10, further comprising:
    updating the directional quality of service parameter based at least in part on one or more of a communication network topology, a change in the sensor information or application information, or channel congestion.

12. The method of claim 1, further comprising:
    modifying the directional quality of service parameter based at least in part on a flow identifier, one or more directional quality of service parameters, a source identification, or a destination identification; and
    updating the mapping based at least in part on the modified directional quality of service parameter.

13. The method of claim 1, further comprising:
    adding a second directional quality of service parameter based at least in part on a flow identifier, one or more directional quality of service parameters, a source identification, or a destination identification.

14. The method of claim 1, further comprising:
    generating the data packet associated with the sensor information or the application information.

15. An apparatus for wireless communication at a user equipment (UE), comprising:
    a processor;
    memory coupled with the processor; and
    instructions stored in the memory and executable by the processor to cause the apparatus to:
        determine a directional quality of service parameter for a data packet based at least in part on sensor information or application information associated with the data packet;
        map a quality of service flow to at least one radio bearer based at least in part on the directional quality of service parameter, wherein the mapping of the quality of service flow to the at least one radio bearer corresponds to at least one or more antenna panels of the UE or to at least one or more precoders; and transmit the data packet via sidelink communications according to the directional quality of service parameter based at least in part on the mapping.

16. The apparatus of claim 15, wherein the instructions to map the quality of service flow to the at least one radio bearer are further executable by the processor to cause the apparatus to:

provide an access stratum layer of the UE with information from an application layer of the UE, wherein generating the data packet further comprises generating the data packet with an application run at the application layer.

17. The apparatus of claim 15, wherein the instructions are further executable by the processor to cause the apparatus to:

modify the directional quality of service parameter based at least in part on a flow identifier, one or more directional quality of service parameters, a source identification, or a destination identification; and update the mapping based at least in part on the modified directional quality of service parameter.

18. The apparatus of claim 15, wherein the instructions to map the quality of service flow to the at least one radio bearer are further executable by the processor to cause the apparatus to:

map the data packet to the at least one radio bearer based at least in part on a flow identifier.

19. The apparatus of claim 15, wherein mapping the quality of service flow to the at least one radio bearer is further based at least in part on one or more of a delay budget, a priority, a packet error rate, a guaranteed bit rate, a minimum bit rate, a range, a maximum data burst volume, or a standardized quality of service index.

20. The apparatus of claim 19, wherein mapping the quality of service flow over the at least one radio bearer is based at least in part on, for each of one or more directions for transmission, one or more of the delay budget, the priority, the guaranteed bit rate, the minimum bit rate, the range, the maximum data burst volume, the standardized quality of service index, or the packet error rate.

21. The apparatus of claim 15, wherein mapping the quality of service flow over the at least one radio bearer is further based at least in part on a service type of the data packet, a cast type of the data packet, or a packet burst associated with the data packet.

22. The apparatus of claim 15, wherein the instructions are further executable by the processor to cause the apparatus to:

determine one or more directions for transmission of the data packet based at least in part on the sensor information or the application information, wherein the directional quality of service parameter is based at least in part on one or more directions for transmission, and wherein transmitting the data packet further comprises transmitting the data packet in the one or more directions for transmission.

23. The apparatus of claim 22, wherein the sensor information or application information further comprises one or more of sensor information from a wireless device in communication with the UE, sensor information from one or more sensors of the UE, a current or upcoming movement of the UE, a current or upcoming location of the UE, map information related to the UE, sensor data sharing or fusing, a type of content in the data packet, a communication mode, a service type associated with the data packet, or a user intention.

24. The apparatus of claim 23, wherein the instructions are further executable by the processor to cause the apparatus to:

update the directional quality of service parameter based at least in part on one or more of a communication network topology, a change in the sensor information or application information, or channel congestion.

25. The apparatus of claim 15, wherein the data packet is a first data packet, and the instructions are further executable by the processor to cause the apparatus to:

receive a second data packet from a first direction, wherein generating the first data packet is based at least in part on the second data packet; and determine that the second data packet is to be forwarded based at least in part on a content of the second data packet, wherein determining the directional quality of service parameter further comprises determining to transmit the first data packet along the first direction.

26. An apparatus for wireless communication at a user equipment (UE), comprising:

means for determining a directional quality of service parameter for a data packet based at least in part on sensor information or application information associated with the data packet;

means for mapping a quality of service flow to at least one radio bearer based at least in part on the directional quality of service parameter, wherein the mapping of the quality of service flow to the at least one radio bearer corresponds to at least one or more antenna panels of the UE or to at least one or more precoders; and means for transmitting the data packet via sidelink communications according to the directional quality of service parameter based at least in part on the mapping.

27. A non-transitory computer-readable medium storing code for wireless communication at a user equipment (UE), the code comprising instructions executable by a processor to:

determine a directional quality of service parameter for a data packet based at least in part on sensor information or application information associated with the data packet;

map a quality of service flow to at least one radio bearer based at least in part on the directional quality of service parameter, wherein the mapping of the quality of service flow to the at least one radio bearer corresponds to at least one or more antenna panels of the UE or to at least one or more precoders; and transmit the data packet via sidelink communications according to the directional quality of service parameter based at least in part on the mapping.

* * * * *